(12) United States Patent
Landau

(10) Patent No.: US 6,706,089 B1
(45) Date of Patent: Mar. 16, 2004

(54) DISPOSAL UNIT

(75) Inventor: Ralph Landau, Brooklyn, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 03/011,650

(22) Filed: Feb. 27, 1948

(51) Int. Cl.⁷ .............................................. B01D 59/12
(52) U.S. Cl. .................. 95/48; 95/45; 23/293
(58) Field of Search .............. 23/2, 2.1, 260, 23/281, 2.2, 88; 183/4.3, 4, 4.4, 115; 95/48, 45; 423/210

(56) References Cited

U.S. PATENT DOCUMENTS

| | | | | |
|---|---|---|---|---|
| 491,699 A | * | 2/1893 | Cutten | 62/617 |
| 999,973 A | * | 8/1911 | Farmer | 55/322 |
| 1,387,857 A | * | 8/1921 | McKee | 95/93 |
| 1,493,183 A | * | 5/1924 | Backhaus | 95/92 |
| 1,578,850 A | * | 3/1926 | Ludwig | 423/241 |
| 1,741,559 A | * | 12/1929 | Dawson | 585/811 |
| 2,526,584 A | * | 10/1950 | Shenk | 423/489 |

OTHER PUBLICATIONS

Mellor's Modern Inorganic Chemistry, 1939, Parkes et al. (Editors), p. 486.*
Hackh's Chemical Dictionary, 3$^{rd}$ edition, Blakiston, 1944, p. 781.*

* cited by examiner

Primary Examiner—Michael J. Carone
Assistant Examiner—Ricardo J. Palabrica
(74) Attorney, Agent, or Firm—Emily G. Schneider; Paul A. Gottlieb

(57) ABSTRACT

The invention relates to a method and apparatus for separating toxic compounds from gaseous mixtures, and more particularly to a method and a portable apparatus for the continuous removal of fluorine and compounds thereof from gaseous mixtures.

3 Claims, 2 Drawing Sheets

DISPOSAL UNIT

My invention relates to a method and an apparatus for separating toxic components from gaseous mixtures, and more particularly to a method and a portable apparatus for the continuous removal of fluorine and compounds thereof from gaseous mixtures.

It is well known that compounds of fluorine attack and have a corrosive effect upon metal parts or surfaces exposed thereto. Pitting of such parts and surfaces may result from prolonged exposure. Protection of plant equipment from these effects may be accomplished by forming a thin protective fluoride coating on the exposed surfaces and parts, either by circulating concentrated fluorine for a predetermined short period through the system, or by subjecting the parts or surfaces to dilute concentrations of fluorine for a sufficient period of time to effect reaction with the metal surfaces. The concentration of fluorine may be controlled by mixing it with some inert gas, such as nitrogen, and passing the mixture through the various units of the system or plant. It may be purged from the unit with nitrogen or other inert gas. The purged gas mixtures, however, cannot be exhausted to the atmosphere in substantial quantities since fluorine and its gaseous compounds are present therein. Under these circumstances it is important to provide for the disposal of such excess fluorine. Despite the great reactivity of this gas, means of disposal are quite limited. The matter of disposal is important, not only from the health standpoint but also for psychological reasons. Not only are persons in the vicinity annoyed by low concentrations of gas, but winds can carry the gas for long distances and it can affect fruit and other crops as well as grass and trees, the extent of damage being a function of concentration and time.

Where a number of conditioning units are involved, particularly where they are separated or cover a considerable area, it may be necessary to provide portable equipment for disposing of the fluorine content of the purged gases instead of going to the expense of installing a central disposal plant and piping the gases from the various units over considerable distances thereto. Even where such a central disposal plant is employed it may be necessary to have portable equipment in reserve to insure uninterrupted operation of the conditioning plant in the event of failure of the central plant.

Various ways have been suggested in the prior art for removing certain components from gaseous mixtures. Absorption of acidic gases in alkaline solutions is illustrated in the patents to Claude, U.S. Pat. No. 1,717,761; Bottoms, U.S. Pat. No. 1,834,016; Stelzmer, U.S. Pat. No. 1,860,298; Brogg, U.S. Pat. No. 1,920,626 and Bottoms, U.S. Pat. No. Re 18958. A precipitation method for fluorine removal is illustrated in Weber, U.S. Pat. No. 2,231,309. The use of liquid absorbents is undesirable in portable equipment in view of the large volumes of liquids which are necessary, the pumping requirements, and the danger of liquid backing up into the equipment being purged. Precipitation procedures are not well adapted to either a continuous process or for portable equipment. Steps involving precipitation are best suited to batch processes where large bulky tanks and other plant facilities are available. In a continuous process the precipitate would tend to clog the valves and circulating system, and in addition, settling tank capacity would be required.

Applicant with a knowledge of these problems in the prior art has for an object of his invention the provision of a portable apparatus for the removal of fluorine values from gaseous mixtures.

Applicant has as another object of his invention the provision of a continuous process for the removal of fluorine values from gaseous mixtures.

Applicant has as another object of his invention the treatment of waste gases containing fluorine values with a highly reactive agent to remove the fluorine values therefrom.

Applicant has as a further object of his invention the provision of an agent which may be employed in solid concentrated form and in relatively small volume to treat waste gases for removing fluorine values therefrom, lending itself to use in systems of portable character.

Applicant has as a still further object of his invention the provision of an agent for removing fluorine values from waste gases which is available in quantity and cheap in price, and which may be easily prepared in useful form.

Other objects and advantages of my invention will appear from the following specification and the accompanying drawings, and the novel features thereof will be particularly pointed out in the annexed claims.

In the drawings, FIG. 1 is a schematic of my improved portable system for continuously treating waste gases from conditioning units or the like to remove fluorine therefrom.

Figure 1:
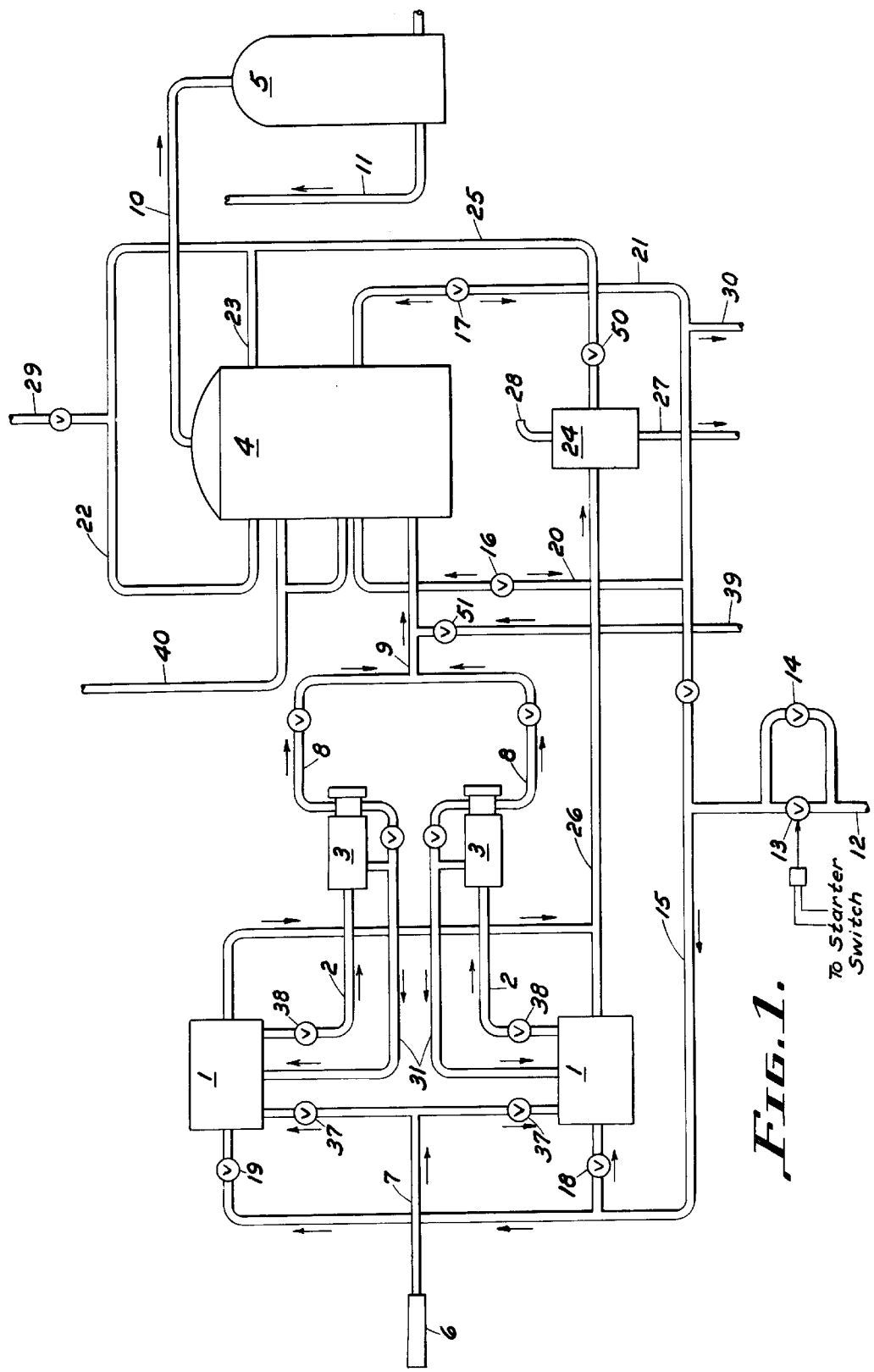

Referring to the drawings in detail, 6 designates generally the outlet of a cell of a conditioning unit which is connected through line 7 to vacuum pumps 1,1, the output lines 2,2 of which feed into mist filters 3,3. Oil from the pumps 1,1 is taken out and returned to them by gravity through lines 31,31. Lines 8,8 lead from common line 9 which extends from the lower portion of tank 4, and the upper end of the tank is connected through pipe 10 to a soda-lime trap 5 which is vented to the atmosphere by pipe 11 extending upwardly from the lower portion thereof. Water for cooling purposes is supplied through main 12 passing through valves 13, 14 to main 15 which branches off through lines 20, 21 passing through valves 16, 17 to enter the lower extremities of tank 4, and through valves 18, 19 to vacuum pumps 1,1. Valve 13 is a solenoid valve which is actuated by the starter switch (not shown) on the vacuum pumps. Valve 14 is provided as a by-pass around the solenoid valve 13.

Lines 20, 21 feed cooling water to the lower extremities of salt reactor 4 for dissipation of the heat of reaction which takes place in the reactor. The operation of this reactor will be described more in detail hereinafter. Lines 22, 23 communicate with the upper portions of the reactor 4 and feed into drain tank 24 through line 25. Likewise, water is fed through return 26 from vacuum pumps 1,1 to drain tank 24. Drain line 27 from the lower portion of tank 24 and vent pipe 28 from the upper end thereof, facilitate removal of the water to the sewer or other depository.

Figure 2:
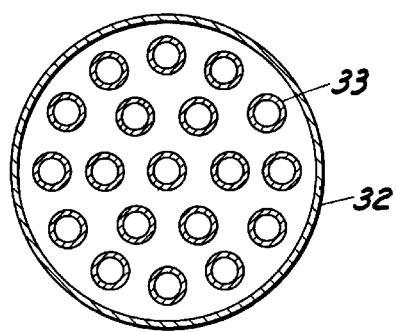
FIG. 2 is a cross sectional view of the salt reactor used in my improved disposal system.
Figure 3:
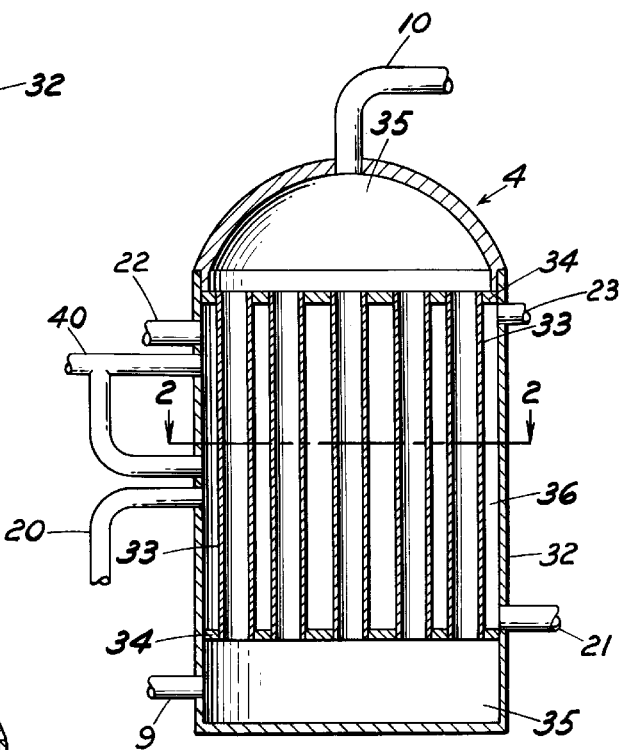
FIG. 3 is a fragmental, sectional elevation of the same salt reactor.

As is seen from FIGS. 2 and 3, one form of salt reactor contemplates the provision of an outer shell or housing 32 having a series of spaced tubes 33, 33 extending longitudinally thereof and parallel to the axis of the shell. These tubes 33, 33 terminate adjacent either end of the housing 32 in a header 34 to provide chambers 35,35 at the upper and lower ends of the tank 32, which are in communication with tubes 33. Intermediate chamber 36 is also formed by the upper and lower headers 34 so that steam and water may be alternately circulated about tubes 33, 33 in chamber 36 for heat transfer purposes without entering the tubes themselves. Line 40 may be provided as a vent and/or liquid level indicator.

Figure 4:
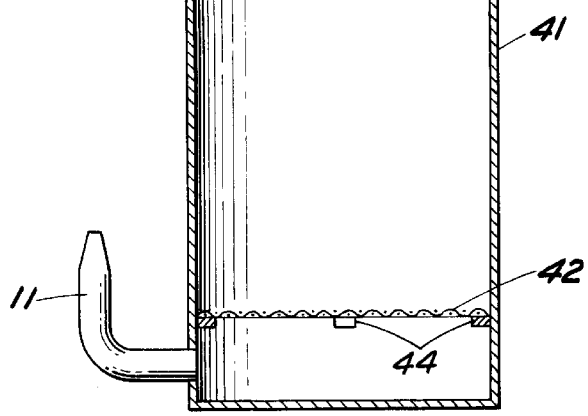
FIG. 4 is a sectional elevation of the soda lime trap used in my improved system.

The soda-lime trap of FIG. 4 is preferably made of a cylindrical housing 41 with a removable cover 43 to permit filling and dumping thereof. Near the lower extremity of the housing a chemical supporting screen 42 of monel or other appropriate material rests on and is supported by legs 44, 44. The gases preferably enter in tube 10 through a nozzle (not shown) and leave through a nozzle and vent 11. A starch-KI bubbler (not shown) may also be provided to indicate exhaustion of the soda-lime. When the solution in the bubbler turns blue, the contents of the trap should be emptied and replaced.

In preparing the system for operation an alkali metal salt, preferably NaCl, is packed into the tubes 33 and upper and lower chambers of the reactor 4. For this purpose rock salt is preferably employed. It is preferably retained in place in the tubes by screen or other appropriate retaining means (not shown) placed across the ends of the tubes 33. While not so shown the bottom may be made removable or an appropriate window may be formed in the lower portion of the tank to facilitate packing and unpacking the salt. The salt bed may suitably be preconditioned by treatment with a diluted fluorine mixture to remove moisture from the bed and build up a layer of sodium fluoride at the gas inlet. For this purpose the pump suction valves 37,37 and discharge valves 38,38 are closed, and valve 51 is temporarily opened permitting fluorine and nitrogen to be fed into the system from cylinders (not shown) to line 39 and pass on out through line 10 and vent 11. After admitting these gases for some time, flow from the cylinders of fluorine is stopped; and the flow of nitrogen is continued for a time thereafter until the system has been purged of fluorine. This preconditioning procedure, however, is optional, and if desired some inert gas such as nitrogen may be employed to remove the moisture. The step may be entirely omitted if desired.

In carrying out the process of conditioning equipment for the handling of corrosive fluorides, pure fluorine gas or up to 20 mol percent mixture of fluorine in nitrogen is fed to the conditioning cells, depending upon whether the circulating or the static treatment is to be given. These gases are evacuated from the cells to the disposal system through connection 6, by means of the two vacuum pumps 1,1 connected in parallel. The discharge of the vacuum pumps passes through lines 2,2 to the mist filters 3,3 where entrained pump oil is removed. The gases then flow on through lines 8,8 and line 9 to the salt reactor 4 where they pass through the salt beds moving upwardly through tubes 33, 33, and where the fluorine reacts completely with the NaCl, the reaction being:

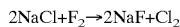

The fluorine in the above reaction replaces the chlorine of the salt, and nitrogen, chlorine and any residual fluorine flow through the line 10 to the soda-lime trap 5. In this trap, chlorine and residual fluorine are absorbed, thus reducing their concentrations to a safe value before the gas is vented to the atmosphere. The halogen content of the exit gas mixture may be maintained at a value of the order of one part in a million by changing the salt and soda-lime beds substantially before they are completely exhausted.

When operation is started with a fresh salt bed, the maximum salt temperature, due to the heat of reaction, will be located close to the inlet end of the bed. With constant gas and cooling water flow rates, the temperature of the main body of the salt bed, beyond the zone of initial contact, is substantially uniform and considerably below that of the zone of highest reactivity. As the salt bed is progressively exhausted, the zone of maximum reactivity and maximum salt temperature moves progressively toward the discharge end of the bed. The exhaustion of the salt bed may thus be followed by temperature measurements at various points in the bed. It is generally desirable to recharge the reactor with fresh salt when a substantial temperature rise occurs slightly beyond the center and toward the discharge end of the bed.

Exhaustion of the soda-lime trap may be checked or determined by continuously contacting a portion of the discharge gases with a starch-potassium iodide indicator heretofore mentioned. Any substantial chlorine or fluorine content of the discharge gases will displace iodine from the potassium iodide and cause a blue color reaction between the iodine and the starch of the indicator. The soda-lime trap is preferably replaced or recharged immediately on the appearance of a blue color in this indicator.

My invention will be further illustrated by a specific example of operation of the equipment described above.

The salt reactor 4 is charged with 2600 lbs. of rock salt of mesh size corresponding to an apparent density of 60–65 lbs. per cu. ft., and the soda-lime trap 5 is charged with 800 lbs. of 4–8 mesh soda-lime. The unit is then preconditioned by charging fluorine through line 39 at a rate of 17.6 lbs. per hour, together with an equal volume of nitrogen as a diluent. After 20 minutes the flow of fluorine is stopped and the nitrogen flow is continued for an additional period of one hour in order to purge the residual fluorine. The unit is then connected by means of line 7 and connection 6 to a cell from which fluorine is to be removed. After ensuring that the sealing oil in vacuum pumps 1,1 and mist filters 3,3 is at a suitable opening temperature, and that cooling water is being supplied through line 12 at a rate of about 5 gallons per minute, one of the vacuum pumps 1 is started. After evacuation of the cell to a pressure of about one-half atmosphere, the second vacuum pump 1 is started; and operation is continued until the cell pressure has reached approximately 0.5 mm. of mercury. The valves 37 are then closed and nitrogen is supplied through lines 39,9, 8,8 and 31,31 until the residual fluorine in the unit has been forced through the salt reactor 4; and the resulting chlorine has been absorbed in soda-lime trap 5.

Successive cells may be evacuated in this manner until the color indicator shows that the soda-lime trap requires recharging, or the temperature differential in the salt reactor indicates that it requires recharging. The 2600 lb. charge of rock salt has a capacity of about 400 lbs. of fluorine, and the 800 lb. charge of soda-lime has a capacity of about 82.5 lbs. of chlorine, corresponding to about 44 lbs. of fluorine. It is thus evident that with this particular unit the soda-lime trap will have to be recharged much more frequently than the salt reactor.

It is to be understood, of course, that the above example is merely illustrative and that my invention is not limited to this particular structure or to the particular quantities of materials disclosed. Various equivalent structures and modifications of operating procedure will be evident to those skilled in the art, and are to be considered within the scope of the present invention. Only such limitations should be imposed on the scope of my invention as are indicated in the appended claims.

Having thus described my invention, I claim:

1. A portable system for removing toxic gases from gaseous mixtures comprising inlet means for the reception of a gaseous mixture of fluorine, pump means for circulating the mixture through the system, a container providing a reaction zone fed through the inlet means, said container including a series of ducts for the reception of chloride compound in the solid state to provide a salt bed and permit the flow of said mixture to insure intimate contact therewith, means for circulating a cooling medium about the walls of said duct to effect a heat transfer and dissipate the heat of reaction in the removal of fluorine from said mixture, and a lime trap fed by said container for the passage of the mixture to remove the chlorine.

2. A portable system for removing toxic gases from gaseous mixtures comprising inlet means for feeding a gaseous mixture to the system, a container in the system having spaced upper and lower chambers connected by a series of spaced ducts for packing of an alkali metal salt therein, means for feeding an initial concentration of fluorine to the system to precondition it, means for alternately circulating steam and water about the walls of the ducts of said container to periodically adjust the heat thereof, pump means for circulating said mixture through the system to react the fluorine with the salt and liberate chlorine gas, and a soda lime trap fed from the container for removing additional quantities of toxic gases.

3. A portable system for removing toxic gases from gaseous mixtures comprising inlet means for feeding a gaseous mixture of fluorine to the system, a container including upper and lower chambers connected by a series of separate ducts for receiving sodium chloride therein, whereby flow of said mixture therethrough brings it into intimate contact with the sodium chloride to liberate chlorine therefrom, means for feeding a cooling medium to the container and for circulating it about the walls of said ducts to effect a heat transfer and dissipate the heat of reaction in the removal of fluorine from said mixture, and a lime trap coupled to the output of the container for passage of the gaseous mixture to remove the chlorine.

* * * * *